UNITED STATES PATENT OFFICE.

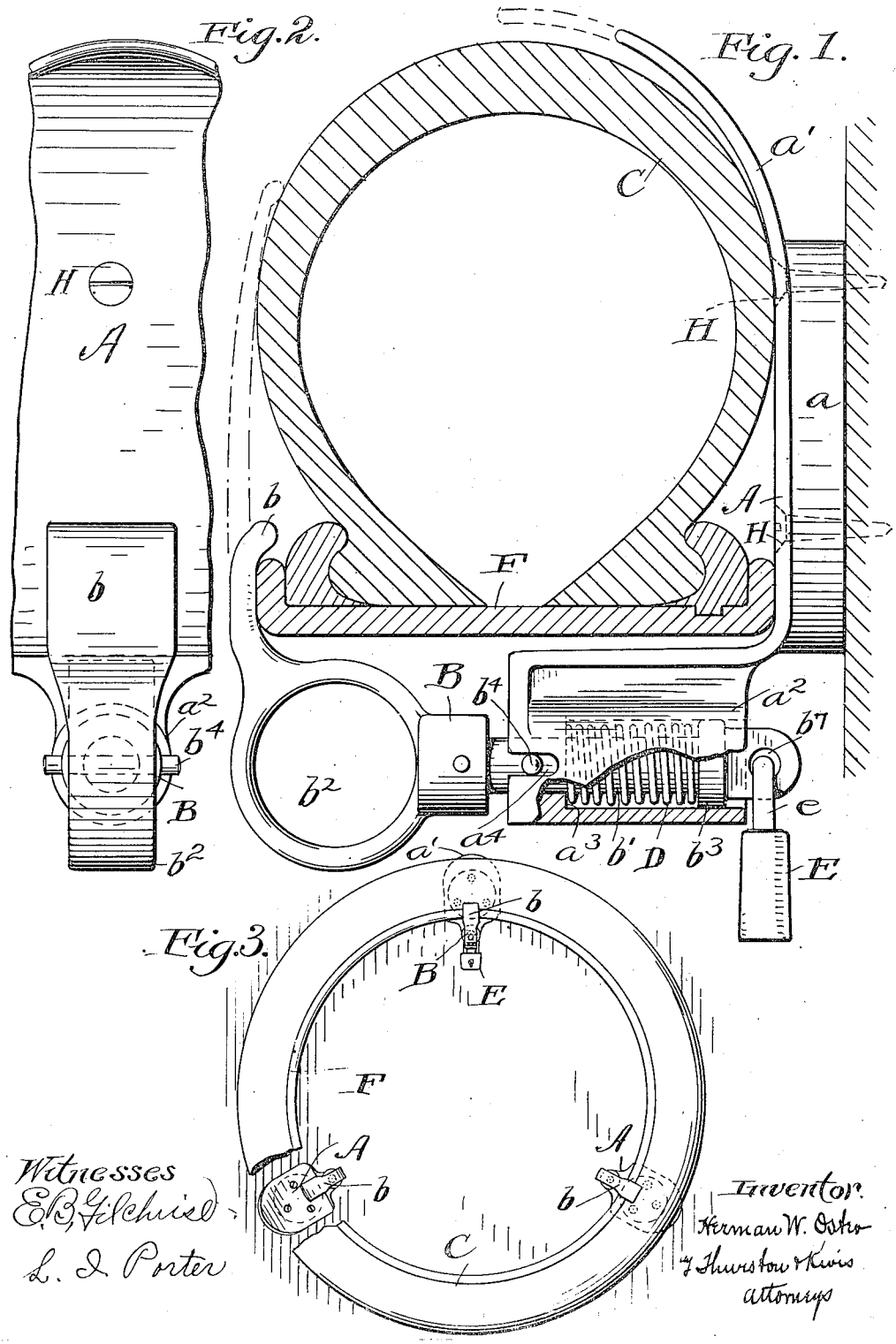

HERMAN W. OSTER, OF CLEVELAND, OHIO, ASSIGNOR OF ONE-HALF TO RUSSELL B. TEWKSBURY, OF CLEVELAND, OHIO.

TIRE HOLDER AND LOCK.

1,132,486.  Specification of Letters Patent.  Patented Mar. 16, 1915.

Application filed November 15, 1913. Serial No. 801,116.

*To all whom it may concern:*

Be it known that I, HERMAN W. OSTER, a citizen of the United States, residing at Cleveland, in the county of Cuyahoga and State of Ohio, have invented a certain new and useful Improvement in Tire Holders and Locks, of which the following is a full, clear, and exact description.

The object of this invention is to provide a sightly, inexpensive, and easily operated device, adapted to be readily secured to an automobile, for partially supporting and securely locking a spare tire thereto.

The invention consists of two principal members, viz. a fixed clamping member, adapted to be secured to the automobile, having an outwardly extended sleeve adapted to pass part way through the open center of the tire, and a movable clamping member having a cylindrical stem which will pass through the open center of the tire, and into said sleeve, said stem being so constructed that, unless prevented, it may be turned and moved endwise in said sleeve. Associated with these two principal members is a spring for moving the movable member in the clamping direction; also means for locking the movable member against any such outward movement as will cause it to release its grip upon the tire; and also other means for preventing the turning of the stem of the movable member in the sleeve of the fixed member.

The invention in its best form is shown in the accompanying drawings and hereinafter described and definitely pointed out in the appended claims.

In the drawing, Figure 1 is a side elevation, partly sectioned, of the device in operative relation to a tire secured on a demountable rim, said tire and rim being shown in section. Fig. 2 is a front elevation of the device with the sides of the fixed clamping member broken away; and Fig. 3 is a front view showing a tire in the embrace of three of said devices.

Referring to the parts by letters, A represents the fixed clamping member which is to be attached to an automobile by suitable means. It may, for example, be made thick in its middle part, as at $a$, for the passage of screws H, which may fasten it to the side of an automobile. This clamping member has a clamping jaw $a^1$, which is preferably slightly curved so as to partly embrace the tire C. It has also an outwardly extended sleeve $a^2$, so placed that it will extend part way through the open center of an annular tire, when said tire is properly placed with respect to jaw $a^1$.

The movable clamping member B has a jaw $b$, and a cylindrical stem $b^1$, which passes through sleeve $a^2$, and consequently through the open center of the tire.

The sleeve $a^2$ is formed with an internal annular shoulder $a^3$; and the stem has an external annular shoulder $b^3$, which lies within said sleeve. A coiled spring D surrounds the stem within the sleeve and is compressed between the two shoulders mentioned, wherefore said spring always acts to draw the member B inward,—that is to say, toward the fixed clamping member.

The member B has adjacent to the jaw and in line with the stem a finger hole $b^2$ for convenience in drawing member B outward and turning it. In the projecting rear end of the stem is a hole $b^7$ for the reception of the bail $e$ of a padlock E.

When the device is constructed with special reference to use in connection with the tire on a demountable rim F, as shown by full lines in the drawing, the jaw $b$ is made short and its end is curved rearwardly, so as to overhang and engage the metal rim. When so constructed, the engagement of the jaw with the rim will prevent the turning of shank $b^1$ in sleeve $a^2$ unless the shank is first pulled out. If the hole ($b^7$) is so placed that when the lock bail passes through it, the stem can not be moved out, no other means are required to prevent the jaw $b$ from being turned down out of the path of the tire. If, however, the device, as thus far described, were used in connection with a substantially narrower rim F, it would be possible to pull jaw $b$ out of engagement with the rim and to then turn it out of the way of the tire, without unlocking it. To prevent this and thereby to render any given device adaptable for use with different widths of rims, the outer end of the sleeve $a^2$ is formed with a longitudinal notch $a^4$, so placed and shaped that it may receive a pin $b^4$, fixed to and projecting rearwardly out from the shank $b^1$, when the jaw $b$ is in the clamping position. If the lock prevents the shank from being drawn forward far enough to free pin $b^4$ from the notch $a^4$, then the jaw can not be turned out of the way of the tire, and the tire therefore can not be removed from the embrace of the device, if additionally some means are provided to hold the tire against movement in its own plane. To effect this result, preferably three devices, constructed as described, are employed, as shown in Fig. 2; although it is only necessary for one of them to be provided with locking instrumentalities.

If the device is to be used for holding a tire casing which is not mounted on a metal rim, it will be necessary to make the jaw $b$ longer, as, for example, as shown by dotted lines in Fig. 1; and perhaps it might be desirable to also increase the length of the jaw $a^1$, as is also indicated by dotted lines.

Having described my invention, I claim:

1. In a tire holding device, the combination of a clamping member having a portion adapted to be connected with an automobile and having also a clamping jaw and a sleeve which extends out from the clamping jaw and is adapted to go partially through the open center of a tire, with an outer movable clamping member having an outer clamping jaw and a cylindrical shank which may pass through the open center of the tire and goes into said sleeve, a spring in said sleeve acting on the shank to draw the movable clamping jaw toward the fixed clamping jaw, and means for locking said shank against longitudinal movement in the reverse direction.

2. In a tire holding device, the combination of a clamping member having a portion adapted to be connected with an automobile and having also a clamping jaw and a sleeve which extends out from the clamping jaw and is adapted to go partially through the open center of a tire, with an outer movable clamping member having an outer clamping jaw, and a cylindrical shank which may pass through the open center of the tire and goes into said sleeve, a spring in said sleeve acting on the shank to draw the movable clamping jaw toward the fixed clamping jaw, and means preventing the turning of the shank in the sleeve without first moving the shank outward with respect to said sleeve, and means limiting the outward movement of said shank.

3. In a tire holding device, the combination of a clamping member having a portion adapted to be connected with an automobile and having also a clamping jaw and a sleeve which extends out from the clamping jaw and is adapted to go partially through the open center of a tire, with an outer movable clamping member having an outer clamping jaw and a cylindrical shank which may pass through the open center of the tire and goes into said sleeve, a spring in said sleeve acting on the shank to draw it inward and thereby draw the movable clamping jaw toward the fixed clamping jaw, said shank being made of such length that it will project from the rear end of the sleeve, and being provided in said projecting rear end with a hole for the reception of a lock bail.

4. In a tire holding device, the combination of a clamping member having a portion adapted to be connected with an automobile and having also a clamping jaw and a sleeve which extends out from the clamping jaw and is adapted to go partially through the open center of a tire, with an outer movable clamping member having an outer clamping jaw and a cylindrical shank which may pass through the open center of the tire and goes into said sleeve, a spring in said sleeve acting on the shank to draw it inward and thereby draw the movable clamping jaw toward the fixed clamping jaw, the sleeve having a notch in its front end, and the shank having a laterally projecting pin adapted to enter said notch, and locking means limiting the endwise forward movement of the shank in said sleeve.

5. In a tire holding device, the combination of a clamping member having a portion adapted to be connected with an automobile and having also a clamping jaw and a sleeve which extends out from the clamping jaw and is adapted to go partially through the open center of a tire, with an outer movable clamping member having an outer clamping jaw, a finger hole below said jaw, and a cylindrical shank which may pass through the open center of the tire and goes into and through said sleeve, and is provided in said sleeve with an external flange, a spring in the sleeve thrusting against said flange, and means for locking the shank against outward movement in opposition to the spring.

In testimony whereof, I hereunto affix my signature in the presence of two witnesses.

HERMAN W. OSTER.

Witnesses:
  E. B. GILCHRIST,
  L. I. PORTER.